United States Patent [19]

Abishev et al.

[11] 4,386,061
[45] May 31, 1983

[54] METHOD OF TREATING PYRITE BEARING POLYMETALLIC MATERIAL

[76] Inventors: Dzhantore N. Abishev, ulitsa Michurina, 21/3, kv. 44; Evnei A. Buketov, ulitsa Lenina, 56, kv. 3; Nazymkul Baltynova, prospekt Sovetsky, 52a, kv. 40; Vitaly P. Malyshev, ulitsa Botanicheskaya, 14, kv. 52; Turabai A. Oralov, ulitsa Sovetskoi Konstitutsii, 18, kv. 348; Egizbai S. Sakpanov, bulvar Mira, 74/2, kv. 42; Abubakir K. Kobzhasov, prospekt Sovetsky, 75, kv. 12; Kazken N. Orazalina, ulitsa Dzhambula, 129, kv. 12, all of Karaganda, U.S.S.R.

[21] Appl. No.: 256,983

[22] Filed: Apr. 24, 1981

[51] Int. Cl.$^3$ .................. C01B 17/06; C01G 3/12; C01G 49/12
[52] U.S. Cl. .................. 423/571; 423/25; 423/47; 423/152; 423/154; 75/1 R; 75/25; 209/8
[58] Field of Search .................. 423/25, 571, 47, 151, 423/152, 153, 154; 209/8, 46, 214; 75/1 R, 6, 21, 23

[56] References Cited

U.S. PATENT DOCUMENTS

| | | | |
|---|---|---|---|
| 564,423 | 7/1896 | Edison | 423/25 |
| 785,167 | 3/1905 | Hedburg | 423/25 |
| 1,053,486 | 2/1913 | Etherington | 75/1 X |
| 1,103,081 | 7/1914 | Rigg | 423/152 |
| 1,398,051 | 11/1921 | Thom et al. | 209/8 |
| 1,478,295 | 12/1923 | Perkins | 209/8 |
| 1,506,663 | 8/1924 | Perkins | 209/8 |
| 4,276,081 | 6/1981 | Kindig et al. | 75/21 |

*Primary Examiner*—Earl C. Thomas
*Attorney, Agent, or Firm*—Steinberg & Raskin

[57] ABSTRACT

A method of treating pyrite bearing polymetallic material comprises heating the material in an atmosphere of reducing gases at a temperature of 450° to 500° C. for a period of 30 to 60 min.

Gases such as hydrogen, or products of conversion of natural gas or mazut can be used to provide the reducing atmosphere.

The roasted copper-containing material is cooled at a rate of 2 to 4 deg. per min and is then subjected to magnetic separation.

The operation of magnetic separation is carried out in two stages with the intensity of the magnetic field ranging from 1000 to 2000 oersted, whereafter copper sulphides are removed from the roast, with a magnetic field intensity ranging from 4500 to 6000 oersted.

4 Claims, No Drawings

METHOD OF TREATING PYRITE BEARING POLYMETALLIC MATERIAL

FIELD OF THE INVENTION

The present invention relates to metallurgy, and more particularly, to a method of treating pyrite bearing polymetallic material, whereby elemental sulphur, for use in the production of sulphuric acid, and pyrrhotine concentrate are obtained. The latter is subjected to further treatment aimed at removing the sulphur residue therefrom to thereby render it suitable for the production of iron-ore pellets. The resultant product, containing nonferrous, noble and rare metals, is further separated into quality standardized selective concentrates.

This invention can find advantageous application in the treatment of pyritous polymetallic materials which include nonferrous, rare and noble metals.

BACKGROUND OF THE INVENTION

There is known in the art a method of treating pyrite concentrate, which comprises heating (roasting) this material in an atmosphere of inert gas without air access, and then subjecting it to flash roasting at a temperature of 1800° to 2000° C. Here, the pyrite concentrate, containing 46 percent by weight of iron and 52.8 percent by weight of sulphur, is subjected to thermal decomposition with the resultant formation of matte and separation of elemental sulphur. The matte is granulated to be thereafter roasted in a furnace in a fluidized bed, this being accompanied by the liberation of sulphurous gases intended for further use in the production of sulphuric acid. The resultant iron concentrate may contain up to 67 percent by weight of iron.

The above method, however, is suitable for the treatment of sulphur-rich pyrite concentrate, with no recovery of nonferrous, noble and rare metals.

There is known a method of treating pyrite concentrates less rich in sulphur and iron, containing 38.5 percent by weight of iron, 39.1 percent by weight of sulphur and 20 percent by weight of gangue. This method comprises oxidizing roasting of the initial material, which is carried out in a furnace in a fluidized bed at a temperature of 965° C. The resultant roast is then subjected to reducing magnetizing roasting at a temperature of 550° to 650° C., to be followed by magnetic separation thereof. The oxidized roast undergoes magnetic separation with a field intensity of 100 to 600 oersted. The resultant magnetic product undergoes pelletizing and firing, whereafter it contains 66 percent by weight of iron, thus being rendered suitable for blast-furnace smelting.

The method described above is also unsuitable for the recovery of nonferrous, rare and noble metals. To accomplish the recovery of these metals and to expand the scope of application of the pyrite material being treated, it is necessary that the two above-mentioned methods should include the operation of chloride sublimation to be effected in a fluidized bed at a temperature of 1250° C. This, however, will render the technological process much more complicated and the equipment cost greatly increased.

To carry out the recovery of nonferrous and noble metals from pyrite concentrates, the initial material is to be subjected to oxidizing roasting effected in a furnace in a fluidized bed at a temperature of 900° C. The off-gases are used for the production of sulphuric acid, and the oxidized roast is granulated in 40%-solution of calcium chloride, whereupon it is subjected to secondary roasting carried out at a temperature of 1250° C. in cylindrical rotary kilns. The resultant granulated iron-containing product is used in blast furnaces. The gases evolved in the process of secondary roasting contain chlorides of nonferrous and noble metals.

The above-described method, includes two-stage roasting of high-grade concentrates and, on being effected at high temperatures, substantially increases the operating cost.

Another known method used for the recovery of nonferrous and noble metals from polymetallic material comprises subjecting this material to reducing roasting, which is effected in a furnace in a fluidized bed at a temperature of 704° to 816° C. and proceeds until pyrrhotine is obtained. The pyrrhotine is then subjected to aqueous lixivitation in an autoclave, with oxygen under pressure being fed therein. The nonferrous metals are passed on to a solution to be further separated therefrom by means of hydrogen sulphide.

However, the roasting procedure combined with the autoclave lixiviation and subsequent hydrometallurgical recovery of nonferrous metals renders the above method cumbersome and complicated.

Various techniques employed today in the treatment of rebellious polymetallic ores, notwithstanding numerous modifications and improvements, fail to satisfy the growing demands of nonferrous metallurgy in high-grade selective concentrates. Thus, the increase of total volume of pyrite bearing polymetallic concentrates, intermediary products and tails makes it absolutely necessary and essential to develop effective and comprehensive methods of treating these types of materials so as to obtain therefrom valuable products, such as elemental sulphur, iron-ore pellets and concentrates of nonferrous metals.

DISCLOSURE OF THE INVENTION

It is therefore an object of the invention to obviate the above disadvantages. What is required is a method of treating pyrite bearing polymetallic material, which will promote more effective recovery of valuable components, simplify the technological process, reduce power input and operating expenses involved in the treatment of pyrite bearing polymetallic material in furnaces of different constructions.

The invention provides a method of treating pyrite bearing polymetallic material, comprising heating this material without air access and its subsequent separation into products by means of magnetic separation, wherein, according to the invention, the heating effected prior to magnetic separation is carried out in the atmosphere of reducing gases at a temperature in the range of 450° to 500° C. for a period of 30 to 60 min.

With the heating of the initial material in the atmosphere of reducing gases to a temperature on the order of 450° to 500° C. for a period of 30 to 60 min, the valuable minerals of nonferrous, rare and noble metals contained in the material under treatment do not undergo any chemical conversion whereas the pyrite undergoes substantial transformations. Such heating conditions bring about destruction of the pyrite crystalline lattice sublimation of sulphur and formation of ferromagnetic hexagonal pyrrhotine.

By heating the initial material in the atmosphere of reducing gases to a temperature below 450° and for a time period of less than 30 min, there is observed incomplete transition of pyrite into ferromagnetic pyrrhotine, and at temperatures above 500° C. and for a time period of more than 60 min, there takes place transition of ferromagnetic pyrrhotine into antiferromagnetic pyrrhotine with a lower content of sulphur, down to troilite. This sharply reduces the recovery of iron to be found in magnetic pyrrhotine concentrate.

With the above conditions observed, it becomes possible to substantially lower the temperature at which the formation of ferromagnetic pyrrhotines from diamagnetic pyrite proceeds. In addition, the operating process is intensified by exothermic reaction, the power input required for the process is reduced; it also becomes possible to carry out the method of the invention in furnaces of various constructions.

The initial material is preferably heated in an atmosphere of the reducing gas hydrogen, or products of conversion of natural gas or mazut.

The use of hydrogen for the above-mentioned purpose permits the obtaining of hydrogen sulfide of the purest chemical composition possible. With the products of conversion of natural gas or mazut it becomes feasible to reduce the operating cost.

Where copper-containing material undergoes heating, its cooling is preferably effected at a rate of 2 to 4 deg. per min, and magnetic separation is preferably carried out in two stages, initially separating iron sulphides at the intensity of a magnetic field ranging from 1000 to 2000 oersted, followed by separation of copper sulphides to be effected with the magnetic field intensity ranging from 4500 to 6000 oersted.

By cooling the roasted, copper-containing material at a rate of 2 to 4 deg. per min, it becomes possible to set up necessary conditions for the transition of the copper minerals contained in the initial material, cubic diamagnetic chalcopyrite, in particular, into tetragonal modification with somewhat lower content of sulphur, possessing magnetic properties. The cooling of the roasted material at a rate lower than 4 deg. per min prolongs the duration of the operating process and adds to its cost, whereas a higher rate of cooling, more than 2 deg. per min, brings down the amount of copper in the copper concentrate.

By carrying out the magnetic separation in two stages and within the aforeindicated range of magnetic field intensity, it becomes possible to simplify the flow sheet provided for the treatment of pyrite bearing polymetallic material and to reduce operating costs, as compared to known methods which comprise multiple roasting of initial material followed by its treatment in autoclaves, or other hydrometallurgical methods of treatment.

A decrease in the intensity of the magnetic field below 1000 oersted in the first stage and below 4500 oersted in the second stage will respectively result in lower yields of pyrrhotine and copper concentrates. An increase in the intensity of the magnetic field above 2000 oersted in the first stage and above 6000 oersted in the second stage will impair quality of the pyrrhotine and copper concentrates.

BEST MODE OF CARRYING OUT THE INVENTION

The invention will be now explained by the following illustrative Examples.

EXAMPLE 1

Ore containing 38.6 wt. % iron, 5.64 wt. % copper, 0.35 wt. % lead, 3.51 wt. % zinc, and 45.4 wt. % sulphur, was subjected to heating in an atmosphere of hydrogen at a temperature of 500° C. for a period of 30 min, whereupon it was cooled at a rate of 2 deg. per min. The cooled material was then subjected to magnetic separation, with the magnetic field intensity of 1000 oersted, to result in pyrrhotine concentrate produced in an amount of 70.5 wt. %. The amount of iron contained in the resultant pyrrhotine concentrate was 88%. Then, the nonmagnetic fraction obtained in the first stage of magnetic separation was subjected to secondary separation, the magnetic field intensity being 6000 oersted. The secondary separation resulted in copper concentrate produced in an amount of 18.9 wt. %, the amount of copper contained in this concentrate was 85.5%. The end product or nonmagnetic fraction contained lead, zinc and gangue minerals, the amount of lead and zinc contained therein was 70% and 78.3%, respectively.

EXAMPLE 2

Pyrite concentrate, containing 38.0 wt. % iron, 43.5 wt. % sulphur, 0.06 wt. % lead, 0.32 wt. % zinc, 0.2 wt. % copper and 12.0 wt. % quartz, was heated in the atmosphere of hydrogen at a temperature of 450° C. for a period of 60 min. The heated material was then subjected to cooling effected at a rate of 4 deg. per min, whereafter it was separated by a magnetic separator with a field intensity of 2000 oersted. The resultant magnetic fraction amounted to 70.84 percent by weight of the total weight of the pyrite concentrate and contained 49.19 wt. % iron, 33.7 wt. % sulphur, 0.02 wt. % lead, 0.10 wt. % zinc, 0.03 wt. % copper and 1.65 wt. % quartz. The recovery of iron and sulphur, percentagewise of the total amount of the initial material, was 91.70 and 54.88, respectively. The nonmagnetic fraction, obtained with the magnetic field intensity of 2000 oersted, was subjected to the second stage of magnetic separation effected with a magnetic field intensity of 4500 oersted. The resultant second magnetic fraction amounted to 10.0 wt. %, and it contained 1.61 wt. % copper; 1.87 wt. % iron; 0.08 wt. % lead; 0.10 wt. % zinc and 2.16 wt. % quartz. The recovery of copper in this fraction was 80.5%.

The nonmagnetic fraction contained 7.0 wt. % iron, 5.0 wt. % sulphur, 0.197wt. % lead, 1.25 wt. % zinc and 55.84 wt. % quartz. The recovery of each of these elements from the initial material was 3.53% iron; 63% lead; 74.84% zinc; 2.20% sulphur and 89.16% quartz.

EXAMPLE 3

Molybdenum commercial product, having the following chemical composition, in percent by weight: 13.50 molybdenum, 34.26 iron, 44.80 sulphur, 5.65 quartz, was subjected to heating at a temperature of 450° C. for a period of 30 min in an atmosphere of conversion products of natural gas, containing 53.0 wt. % hydrogen, 32.0 wt. % carbon monoxide, 6.0 wt. % carbon dioxide, 2.5 wt. % nitrogen and 8.5 wt. % water vapour. After cooling, the material was subjected to magnetic separation with a field intensity of 1500 oersted. The resultant magnetic fraction amounted to 62 percent by weight of the total weight of the initial material, the recovery of iron in this fraction was 95.38%. The resultant nonmagnetic fraction contained molybdenum and quartz, the recovery of which was 98.32% and 96.58%, respectively.

EXAMPLE 4

Molybdenum commercial product of the composition similar to that of Example 3 was heated at a temperature of 450° C. for a period of 30 min in an atmosphere of mazut conversion products containing 14.0 wt. % hydrogen, 24.0 wt. % carbon monoxide, 2.0 wt. % carbon dioxide, 5.0 wt. % water vapour with nitrogen being the balance. After cooling, the material was subjected to magnetic separation with a field intensity of 1500 oersted. The resultant magnetic fraction amounted to 63.2 percent by weight of the total weight of the initial material, the recovery of iron in this fraction was 96.23%. Nonmagnetic fraction contained molybdenum and quartz, the recovery of which was 97.84% and 96.5%, respectively.

INDUSTRIAL APPLICABILITY

The method of the invention has been tested to prove suitable for treatment of various pyrite bearing polymetallic materials with the purpose of recovering therefrom elemental sulphur, pyrrhotine concentrate, the latter being high-grade material used for the production of iron-ore pellets and sulphuric acid, selective copper concentrate and the product rich in nonferrous, noble and rare metals, to be further separated into quality standardized selective concentrates.

What is claimed is:

1. Method of recovering sulphur, iron and non-ferrous metals from polymetallic pyrite containing sulphur, iron and non-ferrous metals, which comprises heating said polymetallic pyrite in a reducing atmosphere at a temperature of 450°–500° C. for 30–60 minutes, thereby causing destruction of the pyrite crystalline lattice with sublimation of sulphur and formation of ferromagnetic pyrrhotine without chemical conversion of the non-ferrous metals, cooling the resulting material, and recovering the iron and non-ferrous metals utilizing magnetic separation with a magnetic field intensity of 1,000 to 2,000 oersted.

2. Method according to claim 1 wherein hydrogen is used for the reducing atmosphere.

3. Method according to claim 1 wherein conversion products of natural gas or mazut are used for the reducing atmosphere.

4. Method according to claim 1 wherein said polymetallic material contains copper and wherein the cooling is effected at a rate of 2–4 degrees per minute and wherein the magnetic separation is effected in two stages, a first stage of separation of iron sulphides with a magnetic field intensity of 1,000 to 2,000 oersted, and a second stage of copper sulphide separation with a magnetic field intensity of 4,5000 to 6,000 oersted.

* * * * *